(12) United States Patent
Colson et al.

(10) Patent No.: US 8,814,510 B2
(45) Date of Patent: Aug. 26, 2014

(54) TURBINE NOZZLE FOR AIR CYCLE MACHINE

(75) Inventors: Darryl A. Colson, West Suffield, CT (US); Harold W. Hipsky, Willington, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 711 days.

(21) Appl. No.: 12/974,159

(22) Filed: Dec. 21, 2010

(65) Prior Publication Data

US 2012/0156028 A1   Jun. 21, 2012

(51) Int. Cl.
  F04D 29/54   (2006.01)
  F02C 6/12   (2006.01)
  F01D 25/28   (2006.01)
  F02C 9/18   (2006.01)

(52) U.S. Cl.
  CPC . *F02C 6/12* (2013.01); *F01D 25/28* (2013.01); *F02C 9/18* (2013.01)
  USPC ........................ 415/191; 415/208.2

(58) Field of Classification Search
  USPC ............. 415/191, 208.1, 208.2, 208.3, 209.4; 416/243, 223 R, 223 B
  See application file for complete search history.

(56) References Cited

U.S. PATENT DOCUMENTS

| | | | |
|---|---|---|---|
| 3,600,781 A * | 8/1971 | Scott | 29/889.22 |
| 4,967,565 A | 11/1990 | Thomson et al. | |
| 5,014,518 A | 5/1991 | Thomson et al. | |
| 5,113,670 A | 5/1992 | McAuliffe et al. | |
| 5,133,194 A | 7/1992 | Army, Jr. et al. | |
| 5,142,762 A | 9/1992 | Dziorny et al. | |
| 5,224,842 A | 7/1993 | Dziorny et al. | |
| 5,249,934 A | 10/1993 | Merritt et al. | |
| 5,309,735 A | 5/1994 | Maher, Jr. et al. | |
| 5,310,311 A | 5/1994 | Andres et al. | |
| 5,784,894 A | 7/1998 | Army, Jr. et al. | |
| RE36,101 E | 2/1999 | Andres et al. | |
| 5,921,683 A | 7/1999 | Merritt et al. | |
| 6,058,715 A | 5/2000 | Strang et al. | |
| 6,427,471 B1 | 8/2002 | Ando et al. | |
| 6,866,477 B2 | 3/2005 | Arness et al. | |
| 7,402,020 B2 | 7/2008 | Beers et al. | |
| 7,484,982 B1 | 2/2009 | Royle | |
| 7,502,717 B2 | 3/2009 | Elpern et al. | |
| 7,779,644 B2 | 8/2010 | Decrisantis et al. | |
| 2007/0134105 A1 * | 6/2007 | Beers et al. | 417/407 |

FOREIGN PATENT DOCUMENTS

CN   1730912   2/2006
WO   2010010339   1/2010

* cited by examiner

*Primary Examiner* — Edward Look
*Assistant Examiner* — Maxime Adjagbe
(74) *Attorney, Agent, or Firm* — Carlson, Gaskey & Olds, P.C.

(57) ABSTRACT

A turbine nozzle for an air cycle machine includes a disk section with a multiple turbine vanes which each extend for a vane height H, a throat width W defined between each of the multiple of turbine vanes, wherein a ratio W/H is 0.745-0.769.

12 Claims, 3 Drawing Sheets

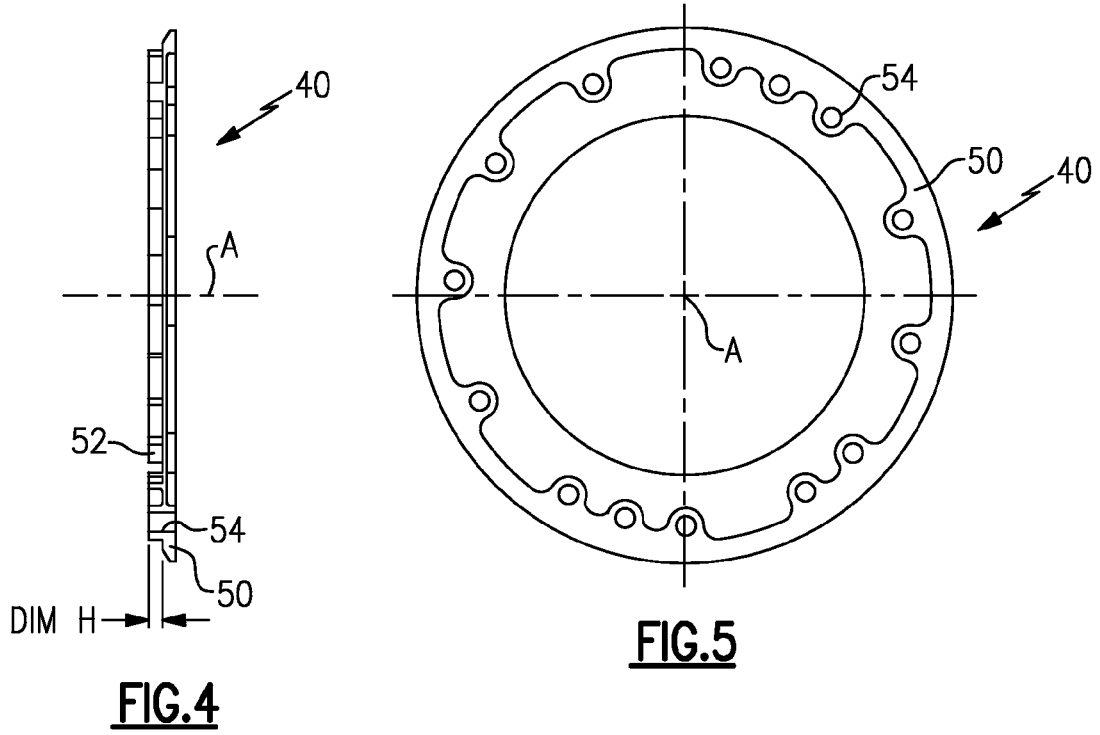
FIG.4
FIG.5
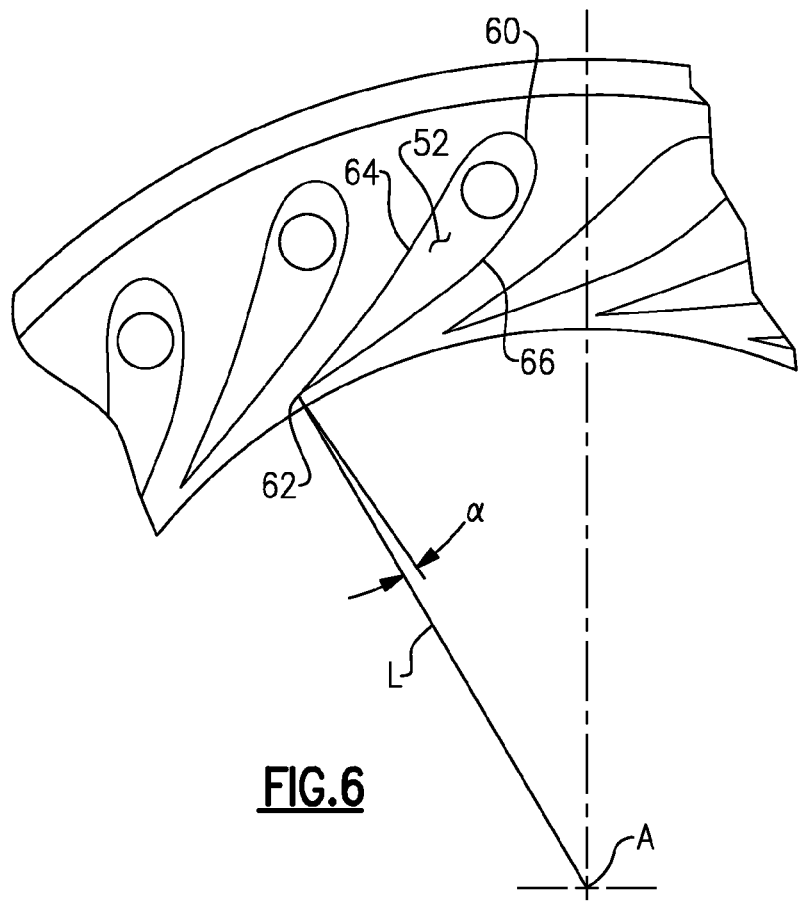
FIG.6

TURBINE NOZZLE FOR AIR CYCLE MACHINE

BACKGROUND

The present disclosure relates to an air cycle machine, and more particularly to a turbine nozzle therefor.

An air cycle machine may include a centrifugal compressor and a centrifugal turbine mounted for co-rotation on a shaft. The centrifugal compressor further compresses partially compressed air, such as bleed air received from a compressor of a gas turbine engine. The compressed air discharges to a downstream heat exchanger or other system before return to the centrifugal turbine. The compressed air expands in the turbine to thereby drive the compressor. The air output from the turbine may be utilized as an air supply for a vehicle, such as the cabin of an aircraft.

SUMMARY

A turbine nozzle for an air cycle machine according to an exemplary aspect of the present disclosure includes a disk section with a multiple turbine vanes which extend for a vane height H relative the disk section, a throat width W defined between each of the multiple of turbine vanes, wherein a ratio W/H is 0.745-0.769.

A turbine nozzle for an air cycle machine according to an exemplary aspect of the present disclosure includes a disk section with a multiple of turbine vanes which extend therefrom, each of the multiple of turbine vanes have an airfoil profile section defined by a set of points in Table T-1 scaled by a desired factor, the set of points include paired chord and thickness dimensions.

An air cycle machine according to an exemplary aspect of the present disclosure includes a turbine nozzle with a multiple of turbine vanes, which each extend for a vane height H, a throat width W defined between each of the multiple of turbine vanes wherein a ratio W/H is 0.745-0.769.

A method of installing a turbine nozzle in an air cycle machine according to an exemplary aspect of the present disclosure includes mounting a turbine nozzle to at least partially define a turbine flowpath, the turbine nozzle having a multiple of turbine vanes, a throat width W is defined between each of the multiple of turbine vanes and each of the multiple of turbine vanes define a vane height H, wherein a ratio W/H is 0.745-0.769.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a sectional view of the turbine nozzle taken along line 4-4 in FIG. 3;

FIG. 5 is a rear view of the turbine nozzle; and

FIG. 6 is an expanded view of a turbine vane of the turbine nozzle.

DETAILED DESCRIPTION

Figure 1:
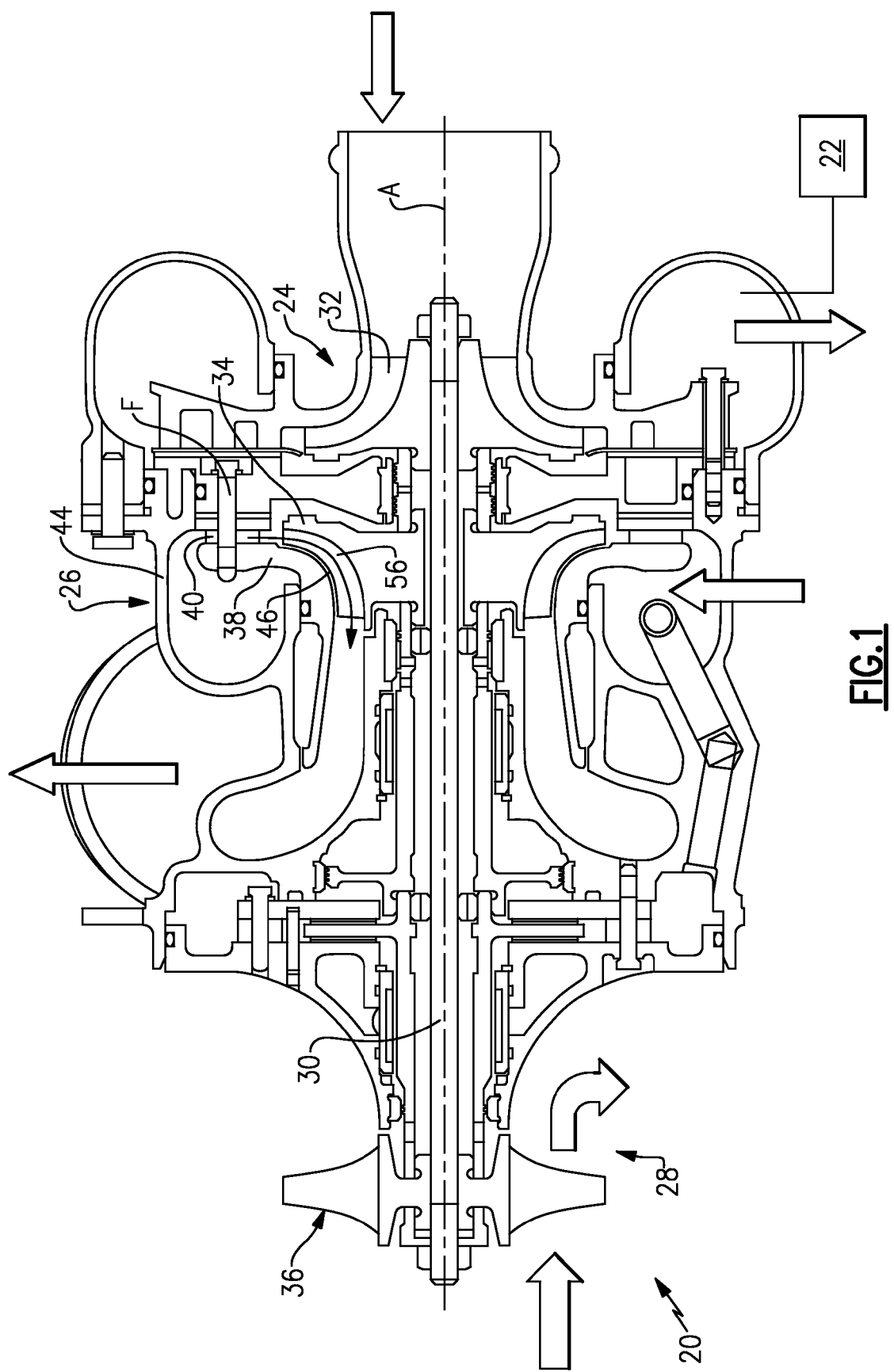
FIG. 1 illustrates a schematic sectional view of an example air cycle machine.

FIG. 1 schematically illustrates an example air cycle machine 20 ("ACM") that is incorporated into an air supply system 22 of a vehicle, such as an aircraft, helicopter, or land-based vehicle. The ACM 20 includes a compressor section 24, a turbine section 26 and a fan section 28 that are generally disposed about a main shaft 30, such as a tie rod. The compressor section 24 includes a compressor rotor 32, the turbine section 26 includes a turbine rotor 34, and the fan section 28 includes a fan rotor 36. The compressor rotor 32, turbine rotor 34, and fan rotor 36 are secured on the main shaft 30 for co-rotation about an axis A.

The turbine section 26 generally includes the turbine rotor 34, a turbine shroud 38 and a turbine nozzle 40 contained within a turbine housing section 44. The turbine section 26 is located axially between the fan section 28 and the compressor section 24. The turbine shroud 38 is attached axially downstream of the turbine nozzle 40 to define a flowpath 46 for the turbine rotor 34.

Figure 2:
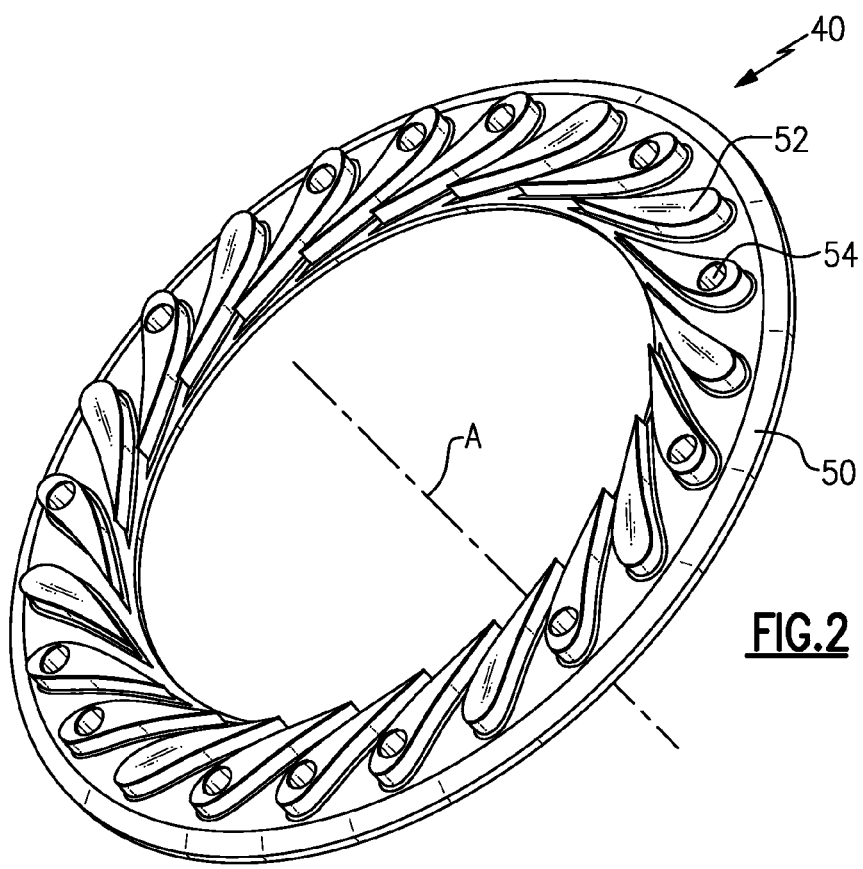
FIG. 2 illustrates a perspective view of a turbine nozzle.
Figure 3:
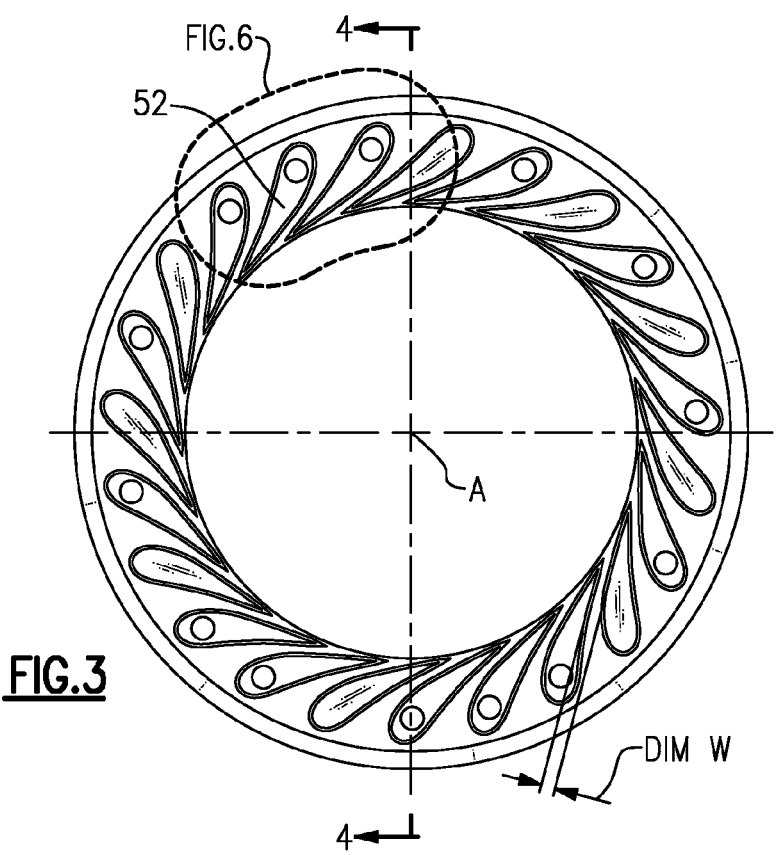
FIG. 3 illustrates a front view of the turbine nozzle.

With reference to the perspective view of the turbine nozzle 40 shown in FIG. 2, the front view of FIG. 3, the cross-sectional view of FIG. 4, and the rear view of FIG. 5, the turbine nozzle 40 generally includes a disk section 50 defined about the central axis A and a multiple of turbine vanes 52 which extend axially along the central axis A. In one non-limiting embodiment, twenty-three turbine vanes 52 are provided. The turbine vanes 52 are located upstream of a multiple of turbine blades 56 which extend from the turbine rotor 34 (FIG. 1). A subset of the multiple of vanes 52 may include apertures 54 to receive fasteners F for attachment of the turbine shroud 38 to the turbine nozzle 40 and other structure (FIG. 1).

The turbine blades 56 and the turbine vanes 52—both of which are defined herein as airfoils—may be designed with computational fluid dynamics (CFD) analytical software and are optimized to meet the specific performance requirements of a specific ACM. Characteristics of the airfoil shape may change from one airfoil shape to another and may include, but are not limited to, curvature, maximum thickness, axial chord length, twist, taper from root to tip, radius of the leading edge, radius of the trailing edge, straightness of the leading and trailing edge from root to tip, etc. It is possible to directly scale up or scale down the airfoil shape to meet different requirements.

Each turbine vane 52 includes a leading edge 60 and a trailing edge 62 which define the chord of the vane 52. A pressure side 64 and a suction side 66 extend between the leading edge 60 and the trailing edge 62. In one disclosed non-limiting dimensional embodiment, a throat width W between each adjacent vane 52 is 0.082-0.1 inches (2.1-2.6 mm) and nominally may be 0.092 inches (2.3 mm) (FIG. 3). Each vane 52 also defines a vane height dimension H which, in one disclosed non-limiting dimensional embodiment, is 0.11-0.13 inches (2.8-3.3 mm) and nominally may be 0.120 inches (3 mm) (FIG. 4). In this disclosed non-limiting dimensional embodiment, a ratio W/H is 0.745-0.769. Such a relationship facilitates directional control characteristics of the turbine flow into the turbine rotor 34.

With reference to FIG. 6, because of the difficulty involved in giving an adequate word description of the particular profile of each turbine vane 52 being described herein, coordinates for one non-limiting dimensional embodiment therefore are set forth in Vane Contour Table T-1.

TABLE T-1

VANE CONTOUR
23x

| DIM X BSC | DIM Y BSC |
|---|---|
| 0.0000 | 0.0000 |
| 0.3690 | 0.1052 |
| 0.4496 | 0.1322 |
| 0.5137 | 0.1565 |
| 0.5901 | 0.1893 |
| 0.6543 | 0.2193 |
| 0.6841 | 0.2340 |
| 0.7129 | 0.2485 |
| 0.7501 | 0.2553 |
| 0.7721 | 0.2660 |
| 0.7929 | 0.2750 |
| 0.8122 | 0.2824 |
| 0.8353 | 0.2879 |
| 0.8549 | 0.2914 |
| 0.8877 | 0.2918 |
| 0.9098 | 0.2869 |
| 0.9258 | 0.2786 |
| 0.9439 | 0.2683 |
| 0.9524 | 0.2484 |
| 0.9545 | 0.1999 |
| 0.9545 | 0.1999 |
| 0.9528 | 0.1881 |
| 0.9491 | 0.1741 |
| 0.9448 | 0.1633 |
| 0.9350 | 0.1467 |
| 0.9265 | 0.1360 |
| 0.9150 | 0.1240 |
| 0.9039 | 0.1136 |
| 0.8839 | 0.0975 |
| 0.8529 | 0.0784 |
| 0.8304 | 0.0671 |
| 0.8150 | 0.0604 |
| 0.7650 | 0.0433 |
| 0.7150 | 0.0306 |
| 0.6639 | 0.0200 |
| 0.6157 | 0.0117 |
| 0.5635 | 0.0049 |
| 0.5300 | 0.0020 |
| 0.4800 | 0.0000 |
| 0.0000 | 0.0000 |

Each turbine vane 52 is dimensionally defined by a paired chord dimension X and a thickness dimension Y based from the trailing edge 62. Chord dimension X is perpendicular to the thickness dimension Y with a slight angular offset alpha from a line L which extends radially from centerline A to the trailing edge 62. Offset alpha, in one non-limiting dimensional embodiment, is 4.7 degrees. The paired dimensions X, Y are provided in Table T-1 to define the profile of each turbine vane 52 along the span thereof.

Table values are computer-generated and shown to four decimal places. However, in view of manufacturing constraints, actual values useful for manufacture of the component are considered to be the valid values to determine the claimed profile of the component. That is, there are typical manufacturing tolerances which must be accounted for in the profile of the component. Accordingly, the values for the profile given in the disclosed Tables are for a nominal component. It will therefore be appreciated that plus or minus typical manufacturing tolerances are applicable to the table values and that a component having a profile substantially in accordance with those values includes such tolerances. For example, a manufacturing tolerance of about +−0.03 inches (0.76 mm) should be considered within design limits for the component. Thus, the mechanical and aerodynamic function of the components is not impaired by manufacturing imperfections and tolerances, which in different embodiments may be greater or lesser than the values set forth in the disclosed Tables. As appreciated by those in the art, manufacturing tolerances may be determined to achieve a desired mean and standard deviation of manufactured components in relation to the ideal component profile points set forth in the disclosed Tables.

In addition, the component may also be coated for protection against corrosion and oxidation after the component is manufactured, according to the values of the Tables and within the tolerances explained above. Consequently, in addition to the manufacturing tolerances for the values set forth in the Tables, there may also be an addition to those values to account for the coating thicknesses. It is contemplated that greater or lesser coating thickness values may be employed in alternative embodiments of the invention.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A turbine nozzle for an air cycle machine comprising:
    a disk section with a multiple of turbine vanes which extend for a vane height H relative said disk section, a throat width W defined between each of said multiple of turbine vanes, where a ratio W/H is 0.745-0.769, wherein each of said multiple of turbine vanes have an airfoil profile section defined by a set of points in Table T-1 scaled by a desired factor, said set of points include paired chord and thickness dimensions.

2. The turbine nozzle as recited in claim 1, wherein said paired chord and thickness dimensions originate from a trailing edge.

3. A turbine nozzle for an air cycle machine comprising:
    a disk section with a multiple turbine vanes which extend therefrom, each of said multiple of turbine vanes have an airfoil profile section defined by a set of points in Table T-1 scaled by a desired factor, said set of points include paired chord and thickness dimensions.

4. The turbine nozzle as recited in claim 3, wherein a throat width W is defined between each of said multiple of turbine vanes and each of said multiple of turbine vanes define a vane height H relative said disk section where a ratio W/H is 0.745-0.769.

5. The turbine nozzle as recited in claim 3, wherein said airfoil profile section defined by a set of points in Table T-1 is adjusted by a manufacturing tolerance.

6. The turbine nozzle as recited in claim 5, wherein said manufacturing tolerance is about +−0.03 inches (0.76 mm).

7. An Air Cycle Machine comprising:
    a compressor section;
    a fan section; and
    a turbine section axially between said fan section and said compressor section, said turbine section includes a turbine nozzle with a multiple turbine vanes which each extend for a vane height H, a throat width W defined between each of said multiple of turbine vanes wherein a ratio W/H is 0.745-0.769, wherein each of said multiple of turbine vanes have an airfoil profile section defined by a set of points in Table T-1 scaled by a desired factor, said set of points include paired chord and thickness dimensions.

8. The Air Cycle Machine as recited in claim 7, wherein said paired chord and thickness dimensions originate from a trailing edge.

9. The Air Cycle Machine as recited in claim 7, further comprising a turbine shroud downstream of said turbine nozzle.

10. A method of installing a turbine nozzle in an air cycle machine, comprising:

mounting a turbine nozzle to at least partially define a turbine flowpath, the turbine nozzle having a multiple turbine vanes which each extend for a vane height H, a throat width W defined between each of said multiple of turbine vanes wherein a ratio W/H is 0.745-0.769, wherein each of said multiple of turbine vanes have an airfoil profile section defined by a set of points in Table T-1 scaled by a desired factor, said set of points include paired chord and thickness dimensions.

11. A method as recited in claim 10, further comprising: mounting a turbine shroud downstream of the turbine nozzle.

12. A method as recited in claim 11, further comprising: mounting a turbine rotor downstream of the turbine nozzle and within the turbine shroud.

\* \* \* \* \*